United States Patent

[11] 3,588,32:

[72] Inventors Henry Ball;
Theodor M. Wagner, Burbank, Calif.
[21] Appl. No. 774,609
[22] Filed Nov. 12, 1968
[45] Patented June 28, 1971
[73] Assignee RCA Corporation

[54] COLORED LIGHT TRANSMISSION COMPENSATING ENCODING FILTER
13 Claims, 3 Drawing Figs.

[52] U.S. Cl. .......... 178/5.4, 350/314
[51] Int. Cl. .......... H04n 9/06
[50] Field of Search .......... 178/5.4 (STC), 5.40; 350/314, 316; 355/32, 34

[56] References Cited

UNITED STATES PATENTS

| | | | |
|---|---|---|---|
| 2,733,291 | 1/1956 | Kell | 178/5.4(STC) |
| 2,736,763 | 2/1956 | Weimer | 178/5.4(STC) |
| 3,378,633 | 4/1968 | Macovski | 178/5.4(STC) |
| 3,419,672 | 12/1968 | Macovski | 178/5.4(STC) |

*Primary Examiner*—Richard Murray
*Assistant Examiner*—Richard P. Lange
*Attorney*—Eugene M. Whitacre ABSTRACT: A color television camera tube has two differe color signal filter grating components through which lig from a subject is projected onto the photosensitive electro of the tube. One grating component has cyan light transm sive (red light blocking) strips, which undesirably absorb son green light, alternating with strips which absorb green light the same extent as the cyan strips. The other grating cor ponent has yellow light transmissive (blue light blockin strips, which undesirably absorb some green light, alternatir with strips which absorb green light to the same extent as tl yellow strips. The strips of the two filter grating componen are so arranged relative to one another that, when the co responding areas of the photosensitive electrode of tl camera tube are scanned by an electron beam, red and blu subject-light-representative signals are generated as amplitud modulations of carrier waves respectively having two differe relatively high fundamental frequencies. The modulated carr er waves are separated by band-pass filters and the respectiv carrier outputs are envelope or otherwise detected to develo red and blue light-representative signals. A luminance signa derived from the camera tube through a low pass filter, i matrixed with the red and blue light-representative signals t produce luminance and color difference signals. Each of th green light absorbing strips adjacent the cyan and yellow ligh transmissive strips is substantially transparent except for a auxiliary band having the property of absorbing green light the material, density and width of the auxiliary band bein such that each auxiliary band absorbs substantially the sam amount of green light as that undesirably absorbed by each o the cyan and yellow light passing strips.

PATENTED JUN 28 1971 3,588,325

INVENTORS
HENRY BALL AND
THEODOR M. WAGNER
BY Eugene M. Whitacre
ATTORNEY

COLORED LIGHT TRANSMISSION COMPENSATING ENCODING FILTER

BACKGROUND OF THE INVENTION

Systems employing a camera tube provided with spatial color encoding filters for producing color television video signals have previously been proposed as illustrated in U.S. Pat. No. 2,733,291 granted to R. D. Kell on Jan. 31, 1956, and in U.S. Pat. No. 3,378,633 granted to A. Macovski on Apr. 16, 1968. The color filter gratings used in such systems comprise, for example, strips of color selective filter material spaced apart by strips of substantially transparent material. When light from a colored subject is projected onto the photosensitive electrode of the camera tube through the filter gratings, a color representative video signal is generated by scanning the electrode with an electron beam. The generated video signal is in the form of an amplitude modulated carrier wave, the frequency of which depends upon the number and placement of the strips of filter material and the rate at which the electron beam scans over the areas of the photosensitive electrode corresponding to the respective strips of filter material. The amplitude of the modulated carrier wave depends upon the intensity of the particular color light from the subject which is transmitted through the encoding filter.

As taught in the Macovski patent, for example, the color encoding filter consists of two gratings, one of which has a first set of strips of material capable of passing substantially only cyan light (i.e., absorbing all red light), alternating with a second set of substantially transparent strips; and the other of which has a first set of strips of material capable of passing substantially only yellow light (i.e., absorbing all blue light), alternating with a second set of substantially transparent strips. The two gratings are mounted in such angular relation to one another and to the photosensitive electrode of the camera tube that the scansion by an electron beam of the respectively corresponding electrode areas produces one carrier wave having a first frequency and modulated in amplitude by red subject-light-representative signals and another carrier wave having a second frequency and modulated in amplitude by blue subject-light-representative signals.

There are, however, some colorimetry deficiencies of such color encoding filters in that they undesirably tend to absorb some of the light that they are designed to pass. Ideally, the cyan strips should absorb only red light and the yellow strips should absorb only blue light. The absorption by the filter strips of any light of the colors that they are intended to pass is interpreted by the system as the presence of light of the color to be absorbed (e.g. red or blue light). Typically, where the filter strips undesirably absorb green light, the red and blue light-representative signals are generated at amplitudes which are greater than they should be in relation to the green light-representative signals. As a result, more than the correct relative amounts of red and blue light are developed at a picture reproducer, which has the effect of desaturating green portions of the picture.

Idealized block-type filters, which have relatively sharp cutoff characteristics, can be used to minimize such undesired light absorption. Dichroic filters approach such an ideal in that cyan and yellow filters of this type absorb substantially only red and blue light respectively and pass with virtually no absorption light of the colors they are designed to pass. Unfortunately, however, such block-type filters poorly match the color responses of the human eye. In a copending application of A. Macovski filed concurrently herewith, entitled COLORED LIGHT ENCODING FILTER and having Ser. No. 774,628, the formerly transparent strips of the color encoding filter of Macovski Patent 3,378,633 are replaced by strips of material having the property of absorbing light of the same color and in an amount substantially equal to that light undesirably absorbed by the cyan and yellow filter strips. In one embodiment of the concurrently filed Macovski application these replacement strips are of material which passes neutral grey light and in another embodiment the strip material passes desaturated magenta light.

It is an object of the present invention to provide an ir proved spatial color encoding filter utilizing a combination color selective filter strips and adjacent strips of transpare material except for a narrow band therewithin of material f absorbing the same amount of color as that undesirably a sorbed by the color selective filter strips, the narrow ban being arranged for ease of fabrication.

A spatial color encoding filter of the general type embod ing the present invention comprises at least one grating havi two sets of parallel strips, preferably of equal widths, the stri of the first set are of a character to pass light of two of thr primary colors and to effectively block by absorption light the third primary color. The character of the first set of stri is such that its color response substantially matches that of t human eye, but it tends to absorb some light of one or both the primary colors that it is intended to pass. This colorimet deficiency is compensated ideally by making the character the second set of strips such that they absorb light of any col undesirably absorbed by the first set of strips in an amou substantially equal to that absorbed by the first set of strips. an example, if the first set of strips is designed to pass cy (i.e., green and blue) light, ideally the second set of stri should be designed to absorb as much green and/or blue lig as is undesirably absorbed by the cyan light passing strips. another example, if the first set of strips is designed to pass ye low (i.e., green and red) light, ideally the second set of stri should be designed to absorb as much green and/or red light is undesirably absorbed by the yellow light passing strips.

According to the present invention, therefore, the secon set of strips is transparent to light of all colors except for auxiliary band of material located within each transpare strip, preferably at the center thereof, the auxiliary ba material being of such character and density, and the width the band being such that each of the second set of strips a sorbs light of the same color as and in an amount substantia equal to the undesired light absorption by the first set of stri The auxiliary band material, in a presently preferred form the invention, is opaque to all light from the subject. Su strips are easier to fabricate than strips having a substantia uniform grey density throughout the entire areas of the strips In one particular television system in which the spatial col encoding filter of the invention is used, two such gratings a provided in a mutually angular relationship such that the sca sion of the corresponding areas of the photosensitive ele trode of the camera tube by an electron beam produces tw carrier waves of such different frequencies that they may separately recovered by electrical band-pass filters. One of t carrier waves is modulated in amplitude by red light-represe tative signals derived from the beam scansion of the photose sitive electrode areas and produced by light derived from t subject through one of the gratings including a first set of cy filter strips. The other carrier wave is modulated by blue ligh representative signals as a result of the beam scansion of t electrode areas and produced by subject derived light throu the other filter grating including a first set of yellow filt strips.

For a more complete disclosure of the invention, referen may be had to the following detailed description of a speci embodiment thereof which is given in conjunction with the a companying drawing, of which:

Figures 1, 2, 3:
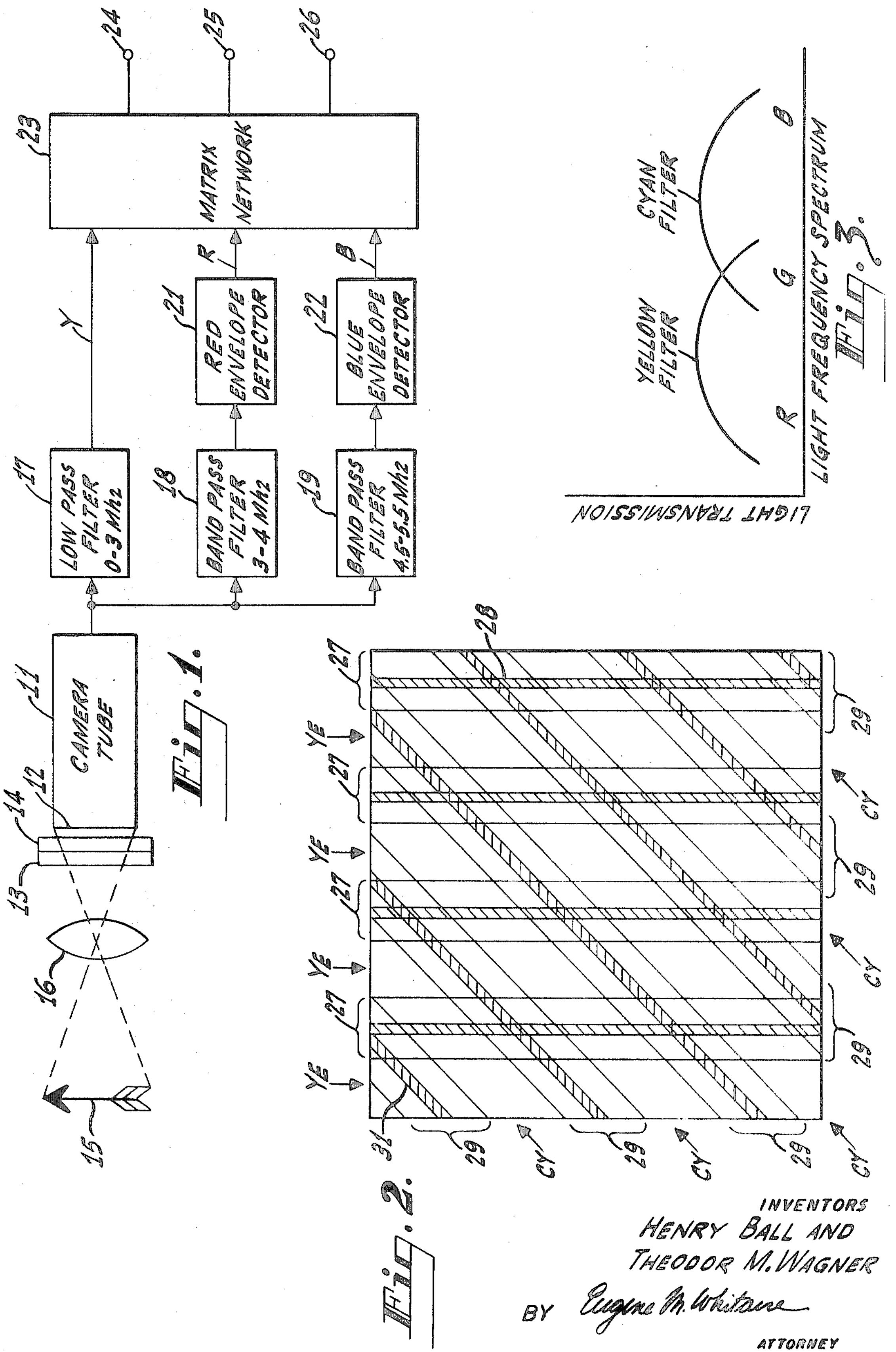
FIG. 1 is a block diagrammatic illustration of the sign generating portion of a television system in which the spat color encoding filter of the invention may be used.
FIG. 2 is a fragmentary portion to a grossly enlarged sca of one form of a spatial color encoding filter embodying t invention.
FIG. 3 depicts typical response characteristics of cyan a yellow color selective strips used in the color encoding filter.

In FIG. 1 a color television camera includes a pickup tu 11, such as a vidicon for example, having an internally form photosensitive electrode 12 and a color filter grating structu 13 located in the optical path between the photosensitive ele trode 12 and an optical system 16 which transmits light from colored subject 15. The color filter grating structure 13 hown mounted externally of pickup tube 11 adjacent aceplate 14 of the tube although it may be located within the ibe adjacent the photosensitive electrode 12. The grating ructure may be of the same general character as those dislosed in the Kell and Macovski patents previously referred to ut incorporating the features of the present invention, one orm of which is shown in FIG. 2, the details of which will be escribed subsequently. The camera tube 11 has a convenonal electrode structure and other apparatus (not shown) by hich to scan the photosensitive electrode 12 so that comosite video signals representative of the luminance and color iformation of the subject are derived from the tube.

The composite video signal derived from the camera tube 1 is applied to a low-pass filter 17 having a frequency pass and from zero (0) to approximately 3 MHz, a first (red) band ass filter 18 having a frequency pass band from approximate- 3 to 4 MHz, and a second blue band-pass filter 19 having a equency pass band from approximately 4.5 to 5.5 MHz. The itput of the low-pass filter 17 is the luminance, or Y, signal, id the respective outputs of the band-pass filters 18 and 19 e carrier waves modulated in amplitude by the red and blue presentative color signals respectively. The frequencies of ie color carriers derived from the camera tube 11 depend oon the number of strips in the respective gratings of the olor filter grating structure 13 and the rate at which the elecon scanning beam traverses the corresponding areas of the iotosensitive electrode 12 of the tube 11. The filter grating omponents of the structure 13, to be described subsequently conjunction with FIG. 2, are so constructed and mutually iented relative to the direction of scanning of electrode 12 the camera tube 11 that the red representative carrier wave is a frequency of approximately 3.5 MHz. and the blue presentative carrier wave has a frequency of approximately MHz. Each of the carriers have double sidebands, each sideind being approximately 0.5 MHz. The amplitudes of the spective carrier waves depend upon the intensity of the red id blue light reaching the tube electrode 12 from the subject 5.

The respective red and blue representative carrier wave itputs from the filters 18 and 19 are demodulated by red and ue envelope detectors 21 and 22 to produce red and blue olor representative signals R and B which are applied to conntional matrix network 23 along with the luminance signal derived from the filter 17. The matrix network combines the , B and R signals in a known manner to produce a luminance gnal at an output terminal 24 and appropriate color difrence signals at output terminals 25 and 26 suitable for ocessing in a known manner to reproduce an image of the bject 15 or for transmission.

The color filter grating structure of FIG. 2, embodying the esent invention has a relatively high frequency component iich includes a first set of spaced vertical strips YE of yellow omprising red and green) light passing material with which alternated a second set of strips 27. Each strip in the second t is substantially transparent except for an auxiliary band 28 material which has the property of absorbing light of the me color and magnitude as that undesirably absorbed by the llow vertical strips. This material may be entirely or partially iaque to all light received from the subject or, in accordance th the concurrently filed Macovski application Ser. No. '4,628, the auxiliary band material may be of a character to ss desaturated magenta (comprising blue and red) light and block by absorption the passage of green light. The density d character of the auxiliary bands 28, and their widths in lation to the total widths of the otherwise transparent strips ' are such that substantially the same amount of green light is sorbed by the alternating strips 27 as is undesirably abrbed by the yellow light passing strips YE Also, it is eferred that the auxiliary bands 28 be located centrally of eir associated transparent strips 27 so as to avoid problems ch as the generation of frequencies higher than the resolun capabilities of the camera tube 11, undesired distortion of e color carrier waves, and the like.

The color filter grating structure of FIG. 2 also has a relatively low frequency component which includes a first set of spaced strips CY of cyan (comprising blue and green) light passing material, which is disposed at about a 45° angle to the sets of yellow and substantially transparent alternating strips (YE and 27) of the high frequency component of the grating structure. Alternating with the set of cyan light passing strips CY is a second set of strips 29, each of which is substantially transparent except for an auxiliary band 31 of material which has the property of absorbing light of the same color and magnitude as that undesirably absorbed by the cyan light passing strips and which, preferably, is located centrally of its associated strip 29. The material of the auxiliary bands 31 may be the same as that of the auxiliary bands 28 of the high frequency grating component, and the band density and width is such that substantially the same amount of green light is absorbed by the alternating strips 29 as is absorbed by the cyan light passing strips CY.

In the presently preferred embodiment of the invention illustrated in FIG. 2, all of the strips YE, 27, CY and 29 of the color filter grating structure are of equal widths with the component comprising the cyan and alternating strips, CY and 29, respectively, oriented at an oblique angle of substantially 45° relative to the substantially vertical yellow and alternating strips, YE and 27, respectively. Thus, the grating component including the yellow strips YE constitutes a relatively high frequency component and that including the cyan strips CY constitutes a relatively low frequency component because the electron beam of the camera tube 11, in one horizontal line scansion, does not cross as many of the areas of the electrode 12 corresponding to the grating component including the cyan strips CY as it does the electrode areas corresponding to the grating component including the yellow strips YE.

The widths and numbers of the strips of the color filter grating of FIG. 2 are such that the scansion of the corresponding areas of the camera tube electrode 12 by an electron beam at the U.S. standard line scanning rate generates, in the output of the tube, a blue color carrier wave of about 5 MHz. and a red color carrier wave of about 3.5 MHz. The equal widths of all of the strips of the color filter grating and the 45° orientation of one group of strips relative to the other has the advantage of effectively eliminating objectionable beat frequencies between the two color carrier waves and, thus, avoids the creation of moire patterns in the reproduced picture. The red carrier wave spectrum overlaps that of the blue carrier wave, but the described structure of the filter gratings is such that the red overlapping signal components occur at odd multiples of one-half of the horizontal line repetition rate so that any overlapping red signal components have minimum visibility.

In the color filter grating of FIG. 2, it is preferred to use color selective materials for the cyan and yellow strips CY and YE, respectively, which have response characteristics as closely corresponding to those of the human eye as is practical. The curves 32 and 33 of FIG. 3 represent generally the response characteristics of the cyan and yellow strips CY and YE, respectively, of FIG. 2. As explained in the previously referred to Macovski Patent 3,378,633, the functions of the cyan and yellow strips CY and YE are to pass all of the blue-green and red-green light, respectively, and to prevent by absorption the passage therethrough of red and blue light, respectively. It is seen from the curves 32 and 33 of FIG. 3, however, that these strips also tend to absorb some green light.

Any such undesired absorption of green light by the color selective filter strips is interpreted by the system as the presence of blue and/or red light. Consequently, the processing of the signals derived from the camera tube 11 produces blue and red signals which are greater in magnitude than correctly produced blue and red signals. When such signals are applied to an image reproducer, these incorrect blue and red signals produce more than the proper amount of blue and red light, thereby effectively desaturating the green light areas of the reproduced picture.

In the fabrication of the color filter structure of FIG. 2, after the color selective portions including the cyan and yellow light passing strips CY and YE have been formed, either in one composite unit or as two superimposed separate units, an additional grid structure including the auxiliary green light absorbing bands 28 and 31 is made, for example, by a photographic process in the desired pattern, such as that shown in FIG. 2. This additional grid is essentially transparent except for the bands 28 and 31 and is superimposed over the cyan and yellow light passing portions to form the array shown in the FIG. The auxiliary bands 28 and 31 do not necessarily have the same widths unless the yellow and cyan strips YE and CY have identical green light absorption properties. It is essential for the successful practice of the invention that the widths of the auxiliary bands 28 be such that the strips 27 have substantially the same absorption capability for green light as the yellow strips YE, and that the widths of the auxiliary bands 31 be such that the strips 29 and the cyan strips CY have substantially equal green light absorption properties.

It is to be understood, as within the purview of the present invention, that the relative orientation of the cyan and yellow filters may be reversed, in which case the blue signals will modulate the lower frequency carrier wave at 3.5 MHz. and the red signals will modulate the higher frequency carrier wave at 5 MHz.

Also, while the invention is shown and described in a television system environment for encoding a luminance and two color representative signals, it is to be understood that it is equally applicable to any system for spatially separating subject derived light into its several component colors. Such a system may relate to photographic reproduction of images in the manner described in the Macovski patent previously referred to. In such a photographic system the encoding filter pattern is imaged by light from a scene onto a film plane instead of onto the photosensitive element of a television camera pickup tube. The colorimetry correction provided by this invention corrects errors in the film-recorded images similarly to the colorimetry error correction of images appearing on the photosensitive element of a television camera pickup tube.

We claim:

1. In a color television system, a spatial color encoding filter through which to project colored light from a subject onto a camera tube, comprising:
- first and second sets of parallel strips, the strips of said first set alternating with the strips of said second set;
- said first set of strips having a transmission characteristic so as to pass light of first and second primary colors from said subject and to effectively block by absorption light of a third primary subject color, but undesirably absorbing some light of said first primary color;
- each of said second set of strips having a portion substantially transparent to said first, second and third primary colors of light from said subject and an auxiliary band located within said portion and having a transmission characteristic so as to absorb light of said first primary color from said subject; and
- the material density and width of each auxiliary band being such that each of said second set of strips absorbs light of said first primary subject color in an amount substantially equal to that undesirably absorbed by each of said first set of strips.

2. A spatial color encoding filter as defined in claim 1, wherein:
- said first primary subject color light is green; and
- said second primary subject color light is blue.

3. A spatial color encoding filter as defined in claim 2, wherein:
- said first set of strips is of a material to pass cyan light from said subject; and
- said auxiliary bands of said second set of strips are substantially opaque to all light from said subject.

4. A spatial color encoding filter as defined in claim 1, wherein:
- said first primary subject color light is green; and
- said second primary subject color light is red.

5. A spatial color encoding filter as defined in clair wherein:
- said first set of strips is of a material to pass yellow li from said subject; and
- said auxiliary bands of said second set of strips are subst tially opaque to all light from said subject.

6. In a color television system, a spatial color encoding fi through which to project light of first, second and third pri ry colors from a subject onto the photosensitive electrode camera tube to be scanned by an electron beam, comprisin
- a low frequency grating and a high frequency grating, e having first and second sets of substantially equal wi parallel strips, the strips of said first set alternating v the strips of said second set;
- the strips of said low and high frequency gratings being arranged relative to one another that, when the c responding areas of the photosensitive electrode of camera tube are scanned by said electron beam, t color representative signals are generated as amplitu modulations of two carrier waves respectively having l and high frequencies relative to one another;
- the first set of strips of said low frequency grating havin transmission characteristic so as to pass light from s subject of said first and second primary color and to fectively block by absorption subject light of said th primary color, but tending undesirably to absorb a p tion of said light of said first primary color;
- the first set of strips of said high frequency grating havin transmission characteristic so as to pass light from s subject of said first and third primary colors and to eff tively block by absorption subject light of said second p mary color, but tending undesirably to absorb a portion said light of said first primary color;
- each of said second set of strips of both said low and h frequency gratings having a portion substantially tra parent to said first, second and third primary colors light from said subject and an auxiliary band locat within said portion and having a transmission char teristic so as to absorb light of said first primary co from said subject; and
- the material, density and width of each of said auxilia bands of said second set of strips being such that s second set of strips of said low and high frequen gratings absorbs light of said first primary subject color an amount substantially equal to that undesirably a sorbed by the respectively associated first set of strips each of said low and high frequency gratings.

7. A spatial color encoding filter as defined in claim wherein:
- said first, second and third primary subject colors are gre blue and red respectively;
- the first set of strips of one of said grating being of a mater to pass cyan (comprising green and blue) light from s subject and to effectively block by absorption said r subject light;
- the first set of strips of the other of said grating being o material to pass yellow (comprising said green and re light from said subject and to effectively block by abso tion said blue subject light; and
- said auxiliary bands of said second set of strips of each said gratings being substantially opaque to all light fr said subject and located centrally in the respective strip 8. A spatial color encoding filter as defined in claim wherein said cyan and yellow light passing materials ha gently sloping response characteristics which substantia match the responses of the human eye to such colors.

9. A spatial color encoding filter as defined in claim wherein:
- said high frequency grating including said yellow lig passing strips is mounted so that the corresponding are of said photosensitive camera tube electrode are substa tially at right angles to the scanning lines of said electr beam, whereby the generated carrier wave modulated by said blue subject-light-representative signals is of a relatively high frequency; and said low frequency grating including said cyan light passing strips is mounted so that the corresponding areas of the photosensitive camera tube electrode are at oblique angles to the scanning lines of said electron beam, whereby the generated carrier wave modulated by said red and subject-light-representative signals is of a relatively low frequency.

10. A spatial color encoding filter for separating image-epresentative light into color components and for forming a ionochromatic image thereof, which image upon being canned yields carrier wave components representative of said olor components, comprising:

first and second gratings, each having first and second sets of substantially parallel strips, the strips of a first set alternating with strips of a second set;

the strips of said first and second gratings being so arranged relative to one another that, when image-representative light is passed therethrough, such light is separated into color components;

said first set of strips of said first grating having a transmission characteristic so as to pass light of first color components from a subject and to block light of color components other than said first components, but undesirably absorbing a portion of said light of said first color components;

said first set of strips of said second grating having a transmission characteristic so as to pass light of second color components from a subject and to block light of color components other than said second components, but undesirably absorbing a portion of said light of said second color components; and each strip of said second set of strips of each of said first and second gratings having a fully transparent portion and an auxiliary band located within said portion, said bands in said first and second gratings having transmission characteristics to absorb light of said first and second color components, respectively, in amounts substantially equal to the amounts thereof undesirably absorbed by corresponding strips of said first sets.

11. A spatial color encoding filter according to claim 10 wherein:

said first color component comprises first and second primary colors; and said second color component comprises second and third primary colors.

12. A spatial color encoding filter according to claim 11 wherein said auxiliary band comprises an opaque strip.

13. A spatial color encoding filter according to claim 12 wherein said first, second and third primary colors are blue, green and red, respectively.

UNITED STATES PATENT OFFICE
CERTIFICATE OF CORRECTION

Patent No. 3,588,325 Dated June 28, 1971

Inventor(s) Henry Ball et al

It is certified that error appears in the above-identified patent and that said Letters Patent are hereby corrected as shown below:

Column 2, line 11, after that portion reading "strips of" insert -- one set alternating with the strips of the other set. The strips of --.

Signed and sealed this 18th day of January 1972.

(SEAL)
Attest:

EDWARD M.FLETCHER,JR.
Attesting Officer

ROBERT GOTTSCHALK
Acting Commissioner of Patents